(12) United States Patent
Lindemann et al.

(10) Patent No.: US 8,931,608 B2
(45) Date of Patent: Jan. 13, 2015

(54) DAMPER HUB FRICTION PACKAGE

(75) Inventors: Patrick M. Lindemann, Wooster, OH (US); Mark Graf, Wooster, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 597 days.

(21) Appl. No.: 13/103,322

(22) Filed: May 9, 2011

(65) Prior Publication Data

US 2011/0278121 A1 Nov. 17, 2011

Related U.S. Application Data

(60) Provisional application No. 61/333,859, filed on May 12, 2010.

(51) Int. Cl.
| | |
|---|---|
| *F16D 47/06* | (2006.01) |
| *F16H 45/02* | (2006.01) |
| *F16F 15/129* | (2006.01) |
| *F16F 15/139* | (2006.01) |

(52) U.S. Cl.
CPC ......... *F16F 15/1292* (2013.01); *F16F 15/1392* (2013.01); *F16H 2045/0205* (2013.01); *F16H 2045/0247* (2013.01); *F16H 2045/0278* (2013.01)
USPC ......................................... 192/3.29; 192/214

(58) Field of Classification Search
USPC ............. 192/3.29, 55.61, 214, 214.1; 60/338; 464/68.41
See application file for complete search history.

(56) References Cited

U.S. PATENT DOCUMENTS

| | | | | |
|---|---|---|---|---|
| 4,177,885 | A * | 12/1979 | Ross ............................... | 192/3.3 |
| 5,062,517 | A * | 11/1991 | Muchmore et al. .......... | 192/3.29 |
| 5,246,398 | A * | 9/1993 | Birk et al. .................. | 464/68.41 |
| 5,429,218 | A * | 7/1995 | Itoh et al. ........................ | 192/38 |
| 7,703,590 | B2 * | 4/2010 | Heck et al. .................... | 192/3.25 |
| 2004/0251104 | A1 * | 12/2004 | Abe et al. ..................... | 192/3.29 |
| 2007/0045074 | A1 * | 3/2007 | Karamavruc ................ | 192/3.29 |
| 2009/0107792 | A1 | 4/2009 | Kneidel et al. | |

* cited by examiner

*Primary Examiner* — Rodney H Bonck
*Assistant Examiner* — Stacey Fluhart
(74) *Attorney, Agent, or Firm* — Simpson & Simpson, PLLC

(57) ABSTRACT

A friction assembly for a torque converter, including: a side plate for a damper in the torque converter; a plate; an output hub for connection to an input shaft for a transmission; and a diaphragm spring. The side plate and the plate are fixedly connected to a turbine shell for the torque converter. The diaphragm spring is directly engaged with the output hub so that the diaphragm spring rotates with the output hub and is axially displaceable with respect to the output hub. The diaphragm spring is directly engaged with the side plate and the plate so that the diaphragm spring is axially restrained by the side plate. The plate and is rotatable with respect to the side plate and the plate.

13 Claims, 4 Drawing Sheets

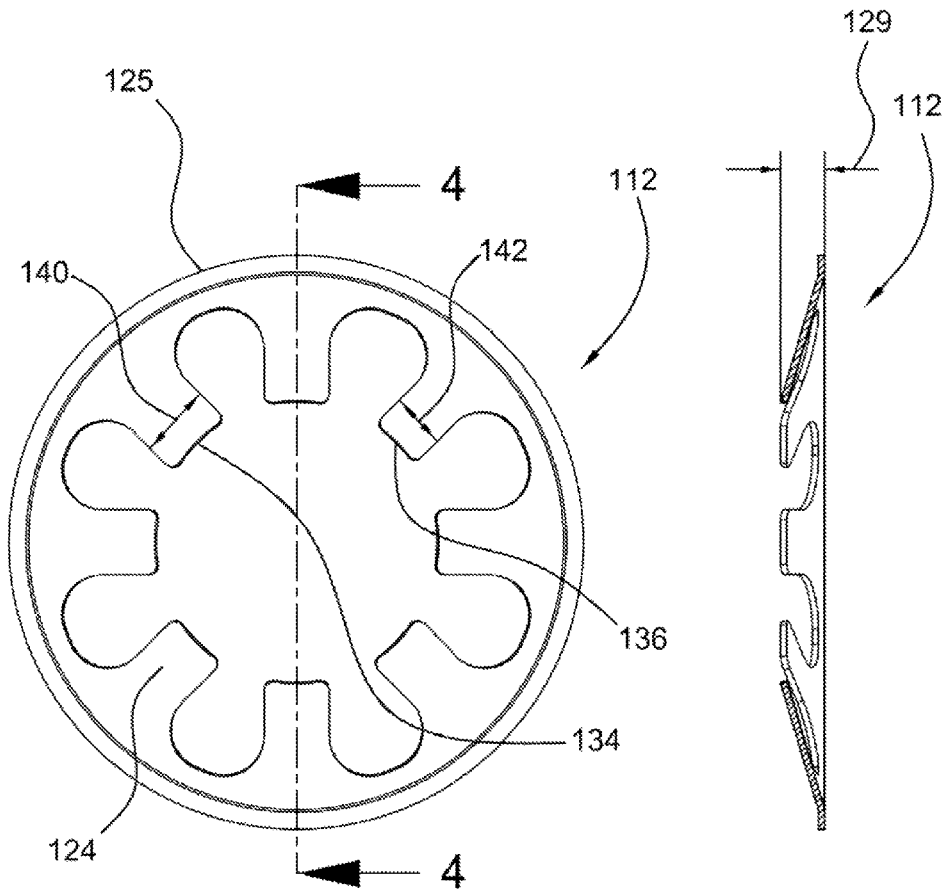

DAMPER HUB FRICTION PACKAGE

CROSS-REFERENCE TO RELATED APPLICATIONS

This application claims the benefit under 35 U.S.C. §119 (e) of U.S. Provisional Application No. 61/333,859 filed on May 12, 2010 which application is incorporated herein by reference.

FIELD OF THE INVENTION

The invention relates to an assembly for providing hysteresis in a torque converter. In particular, the invention relates to a diaphragm spring to absorb energy between rotating elements in the torque converter.

BACKGROUND OF THE INVENTION

Commonly owned U.S. patent application Ser. No. 12/288,859, filed Oct. 24, 2008 teaches a series damper with hysteresis in one damper. The preceding application teaches an axial height for a compressed diaphragm spring being related to configuration of a side plate for the damper.

BRIEF SUMMARY OF THE INVENTION

According to aspects illustrated herein, there is provided a friction assembly for a torque converter, including: a side plate for a damper in the torque converter; a plate; an output hub for connection to an input shaft for a transmission; and a diaphragm spring. The side plate and the plate are fixedly connected to a turbine shell for the torque converter. The diaphragm spring is directly engaged with the output hub so that the diaphragm spring rotates with the output hub and is axially displaceable with respect to the output hub. The diaphragm spring is directly engaged with the side plate and the plate so that the diaphragm spring is axially restrained by the side plate and the plate. The diaphragm spring is rotatable with respect to the side plate and the plate.

According to aspects illustrated herein, there is provided a torque converter, including: a damper; a turbine; an output hub for connection to an input shaft for a transmission; and a diaphragm spring. The diaphragm spring is directly engaged with the output hub so that the diaphragm spring rotates with the output hub. The diaphragm spring is axially fixed with respect to the damper and the turbine and is rotatable with respect to the damper and the turbine.

According to aspects illustrated herein, there is provided a torque converter, including: a damper side plate; a plate; a turbine shell with a portion axially disposed between the damper side plate and the plate; an output hub for connection to an input shaft for a transmission; and a diaphragm spring with an outer circumferential portion compressively engaged between the damper side plate and the plate. The diaphragm spring is directly engaged with the output hub so that the diaphragm spring rotates with the output hub. An axial height of the diaphragm spring between the side plate and the plate is equal to an axial thickness of the portion of the turbine shell.

These and other objects and advantages of the present invention will be readily appreciable from the following description of the invention and from the accompanying drawings and claims.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 3 is a front view of the diaphragm spring shown in FIG. 2;

FIG. 4 is a cross-sectional view of the diaphragm spring shown in FIG. 3, generally along line 4-4 in FIG. 3; and, FIG. 5 is a back view of the output hub and diaphragm spring shown in FIG. 2.

DETAILED DESCRIPTION OF THE INVENTION

At the outset, it should be appreciated that like drawing numbers on different drawing views identify identical, or functionally similar, structural elements of the invention. It is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1A:
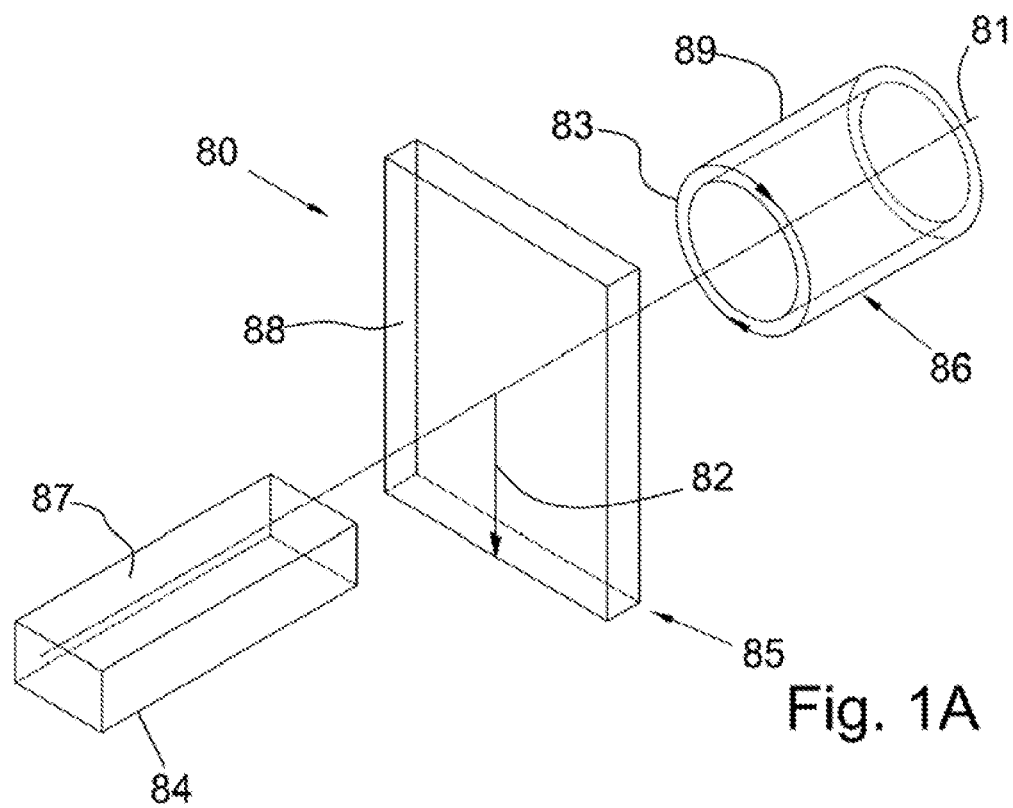
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
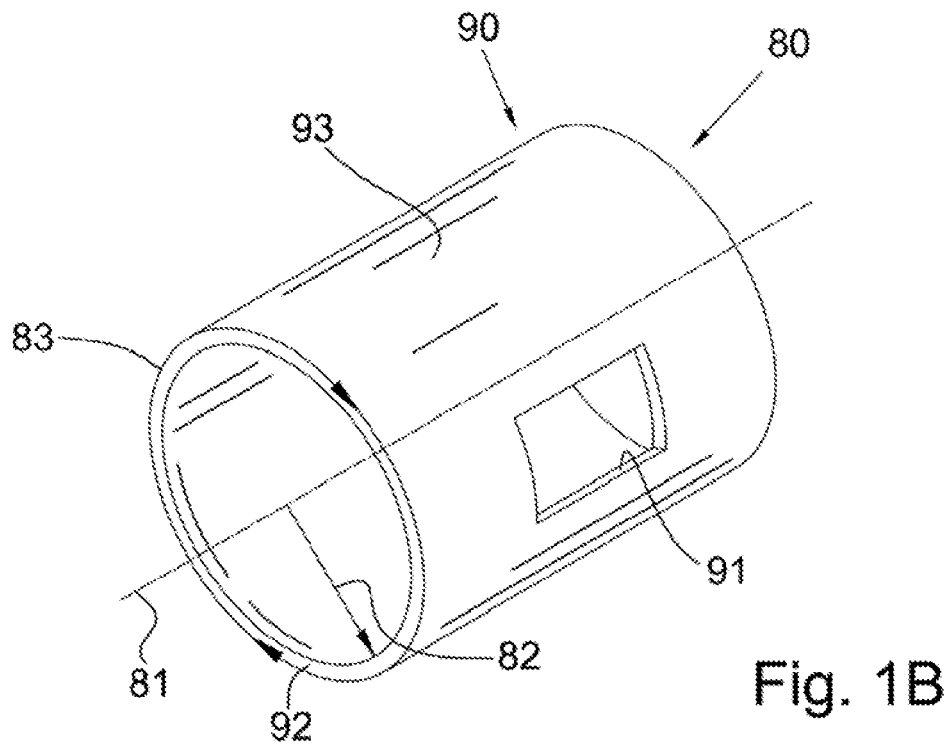
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

Figure 2:
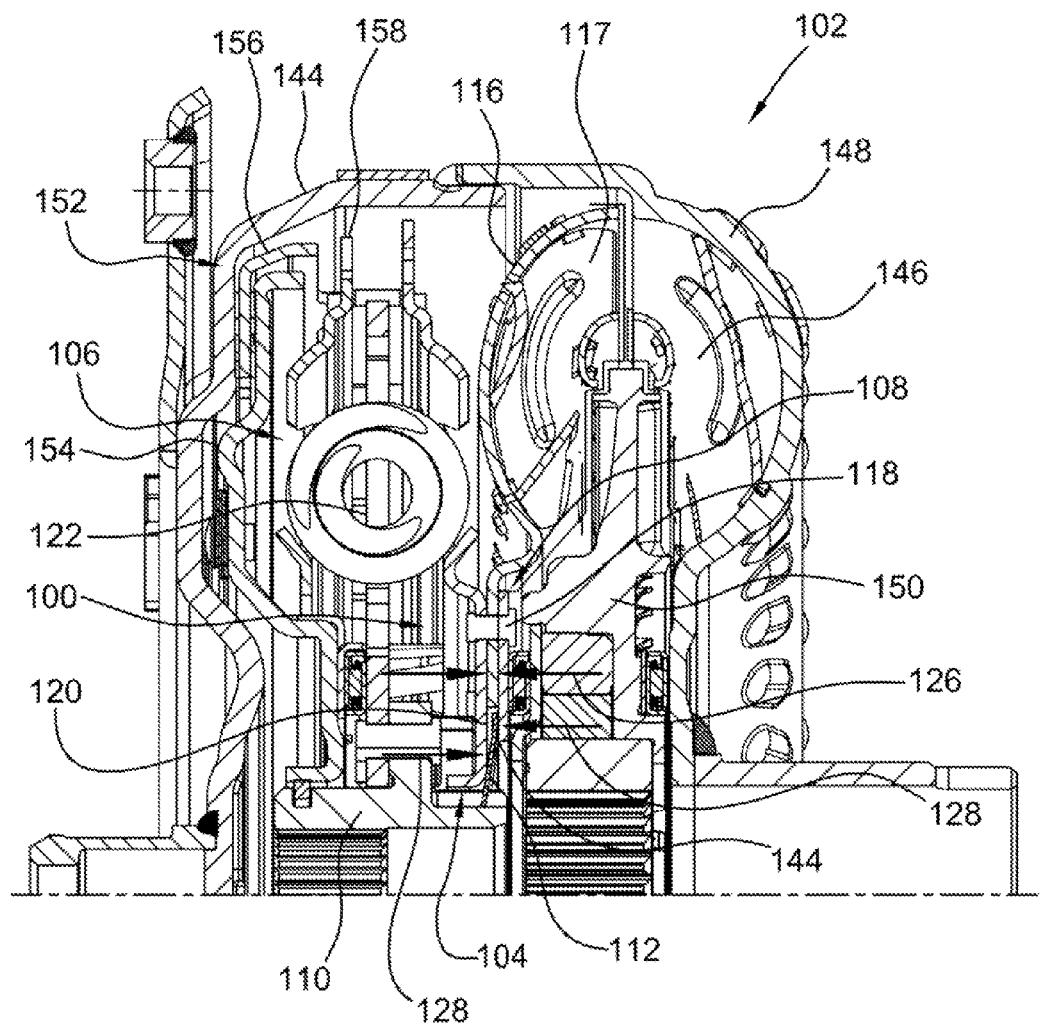
FIG. 2 is a partial cross-sectional view of a torque converter with a friction assembly.

FIG. 2 is a partial cross-sectional view of a torque converter with friction assembly 100. Friction assembly 100 includes side plate 104 for damper 106, plate 108, output hub 110, and diaphragm spring 112. The output hub is for connection to transmission input shaft (not shown). The side plate and the plate are fixedly connected to turbine shell 116 for turbine 117 by any means known in the art, for example, by rivet 118. Any number of rivets 118 can be used.

FIG. 3 is a front view of diaphragm spring 112 shown in FIG. 2.

FIG. 4 is a cross-sectional view of diaphragm spring 112 generally along line 4-4 in FIG. 3.

Figure 5:
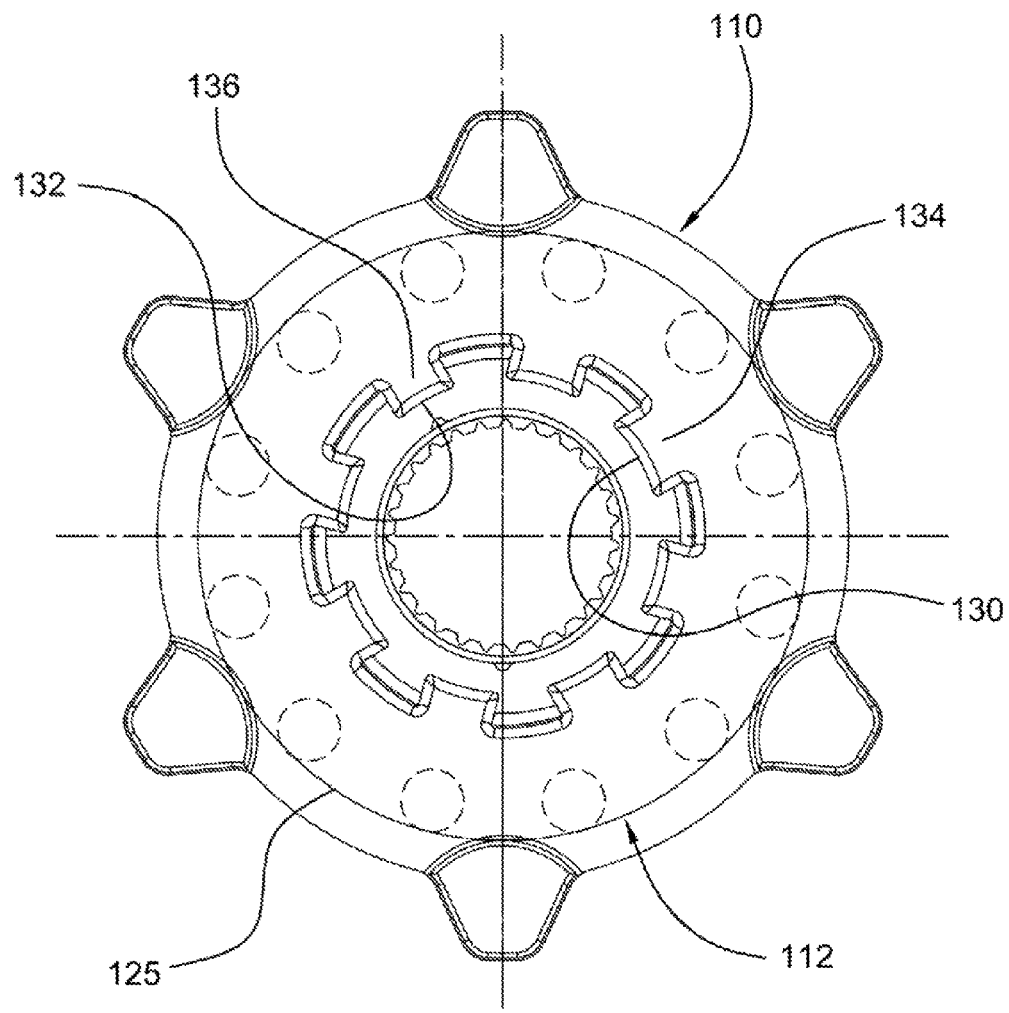

FIG. 5 is a back view of output hub 110 and diaphragm spring 112 shown in FIG. 2. The following should be viewed in light of FIGS. 2 through 5. In one embodiment, the diaphragm spring is directly engaged with the output hub so that the diaphragm spring rotates with the output hub. That is, rotation of the output hub causes simultaneous rotation of the spring due to the engagement of the spring and the hub. In one embodiment, the spring is axially displaceable with respect to the hub. In one embodiment, the diaphragm spring is directly engaged with the side plate and the plate so that the diaphragm spring is axially retained by the side plate and the plate. Further, the spring is rotatable with respect to the side plate and the plate. That is, the spring is able to rotate relative to the side plate and the plate. In one embodiment, the spring is engaged with surface 120 of the side plate, facing away from flange 122 for the damper.

The diaphragm spring is axially fixed with respect to the damper and the turbine. In one embodiment, the diaphragm spring is axially fixed with respect to the side plate and the plate. In one embodiment, the diaphragm spring is frictionally engaged with the side plate and the plate. For example, the side plate and the plate are in compressive engagement with the spring, that is, the side plate and the plate apply respective axial forces on the spring, for example, on inner and outer circumferential portions 124 and 125, respectively, of the spring, such that the spring is compressed between the side plate and the plate and placed under tension. The spring reacts to the compressive engagement by exerting force against the side plate and the plate.

The compressive and frictional engagement of the spring with the side plate and the plate, and the relative rotation of the spring with respect to the side plate and the plate provides hysteresis, or absorption of undesirable energy, in the torque converter. That is, assembly 100 absorbs energy that would otherwise result in undesirable vibration or oscillation in the torque converter. It is desirable for the force on the spring and the friction between the spring and the side plate and plate to be constant among torque converters including assembly 100. The turbine shell has thickness 126. In one embodiment, axial height 128 of the diaphragm spring between the side plate and the plate is equal to thickness 126.

The diaphragm spring is axially compressed between the side plate and the plate. A compressive force between the diaphragm spring and the side plate and the plate is determined solely by characteristics of the spring itself and by an axial space between the side plate and the plate, which is equal to the thickness of the turbine shell. Thus, the compressive and frictional forces between the spring and the side plate and plate also are determined solely by characteristics of the spring itself and by an axial space between the side plate and the plate. That is, the only factor, outside of the spring itself, affecting the compressive force is thickness 126. For example, tolerances associated with other components of the torque converter, such as a thickness of side plate 104, do not impact the compressive force. In one embodiment, the spring characteristic is free height 129 of the spring. The free height is the axial extent of the spring in a free, or unloaded, state. Thus, advantageously, height 128, which is the primary parameter for determining the load carried by the diaphragm spring, is dependent only on thickness 126, rather than, for example, characteristics or structure of other or multiple components in the torque converter.

In general, respective tolerances for thickness 126 for a plurality of torque converters including assembly 100, for example, torque converter 102, are tightly controlled, resulting in a high degree of consistency for respective heights 128 and for the respective forces on the springs and the respective friction between the springs and the side plates and plates. Thus, advantageously, the respective loads carried by the diaphragm springs are very consistent among the plurality of torque converters. That is, respective springs 112 are not required to operate over a wide range of loading. Operating over a wide range of loading typically results in inconsistent results for the respective springs. For example, such operation results in inconsistent absorption of undesirable energy. However, advantageously, the respective loads experienced by torque converters including assembly 100 are desirably consistent. For example, the loads do not fluctuate due to the spring operating over an undesirably wide range of conditions, such as differences in respective compressive and frictional forces between respective springs and respective side plates and plates.

In one embodiment, the output hub includes recesses 130 and 132 and the diaphragm spring includes protrusions 134 and 136 extending radially inward from inner circumference 124 of the diaphragm spring. Protrusions 134 and 136 have circumferential lengths 140 and 142, respectively, different one from the other. For example, length 140 is greater than length 142. Protrusions 134 and 136 are disposed in recesses 130 and 132, respectively. The configuration of the recesses and protrusions ensures that the spring is installed in the assembly in the configuration shown in the figures. Specifically, the spring is installed such that the spring does not contact corner 144 of plate 108. Contact with the corner could cause undesirable wear on the spring. Thus, due to the relative size and placement of the recesses and protrusions, it is only possible to install the spring in the configuration shown in the figures. For example, protrusion 134 fits in recess 130, but is too wide to fit in recess 132, thus only one orientation of the spring and the hub is possible.

In one embodiment, torque converter 102 includes cover 144, pump 146, pump shell 148, stator 150, and torque converter clutch 152. Clutch 152 includes piston plate 154, and clutch plate 156 rotationally engaged with side plate 158 of the damper. Although assembly 100 is shown with torque converter 102 having a particular set of and configuration of components, it should be understood that assembly 100 is not limited to use only with a torque converter including the set of and configuration of components shown for torque converter 102, and that assembly 100 is usable with torque converters having different sets of and/or configurations of components than those shown for torque converter 102.

In one embodiment, assembly 100 is fabricated by stacking the diaphragm spring and the turbine shell on plate 108, stacking the side plate on the spring and turbine shell, compressing the stacked components so that the side plate and plate 108 are in contact with the turbine shell and fastening the side plate, turbine shell, and plate with rivet or rivets 118.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A friction assembly for a torque converter, comprising:
    a side plate for a damper in the torque converter;
    a plate;
    an output hub;
    a turbine shell for the torque converter; and,
    a diaphragm spring, wherein:
        the side plate and the plate are fixedly connected to the turbine shell;
        the diaphragm spring is directly engaged with the output hub so that the diaphragm spring rotates with the output hub and is axially displaceable with respect to the output hub;
        the diaphragm spring is directly engaged with the side plate and the plate so that the diaphragm spring is axially restrained by the side plate and the plate; and,
        the diaphragm spring is rotatable with respect to the side plate and the plate.

2. The assembly of claim 1 wherein the diaphragm spring is frictionally engaged with the side plate and the plate.

3. The assembly of claim 1 wherein the diaphragm spring is compressively engaged with the side plate and the plate.

4. The assembly of claim 1 wherein:
    the turbine shell has a thickness; and,
    an axial height of the diaphragm spring between the side plate and the plate is equal to the thickness of the turbine shell.

5. The assembly of claim 1 wherein:
    the turbine shell has a thickness;
    the diaphragm spring is axially compressed between the side plate and the plate;
    a compressive force between the diaphragm spring and the side plate and the plate is determined by a free height of the spring and an axial space between the side plate and the plate; and,
    the axial space is equal to the thickness of the turbine shell.

6. The assembly of claim 1 wherein:
    the side plate includes a surface facing away from a flange for the damper; and,
    the diaphragm spring is engaged with the surface of the side plate.

7. The assembly of claim 1 wherein:
    the output hub includes first and second recesses;
    the diaphragm spring includes first and second protrusions extending radially inward from an inner circumference of the diaphragm spring and disposed in the first and second recesses, respectively; and,
    the first and second protrusions have first and second circumferential lengths different one from the other.

8. A torque converter, comprising:
    a damper including:
        a flange;
        a side plate; and,
        a first spring engaged with the flange and the side plate;
    a plate non-rotatably connected to the side plate;
    a turbine shell:
        located between the side plate and the plate in an axial direction; and,
        non-rotatably connected to the side plate and the plate;
    an output hub non-rotatably connected to the flange; and,
    a diaphragm spring, separate from the output hub, wherein:
        the diaphragm spring is directly engaged with the output hub and the plate so that the diaphragm spring rotates with the output hub; and,
        the diaphragm spring is axially fixed with respect to the damper and the turbine and is rotatable with respect to the damper and the turbine.

9. A torque converter, comprising:
    a damper side plate;
    a plate;
    a turbine shell with a portion axially disposed between the damper side plate and the plate;
    an output hub; and,
    a diaphragm spring with an outer circumferential portion compressively engaged between the damper side plate and the plate, wherein:
        the diaphragm spring is directly engaged with the output hub so that the diaphragm spring rotates with the output hub; and,
        an axial height of the diaphragm spring between the side plate and the plate is equal to an axial thickness of the portion of the turbine shell.

10. The assembly of claim 9 wherein the diaphragm spring is frictionally engaged with the damper side plate and the plate.

11. The assembly of claim 9 wherein:
    a compressive force between the diaphragm spring and the damper side plate and the plate is determined by a free height of the spring and an axial space between the damper side plate and the plate.

12. The assembly of claim 9 wherein:
    the damper side plate includes a surface facing away from a flange for the damper; and,
    the diaphragm spring is engaged with the surface of the damper side plate.

13. The assembly of claim 9 wherein:
    the output hub includes first and second recesses;
    the diaphragm spring includes first and second protrusions extending radially inward from an inner circumference of the diaphragm spring and disposed in the first and second recesses, respectively; and,
    the first and second protrusions have first and second circumferential lengths different one from the other.

* * * * *